Figure 9:
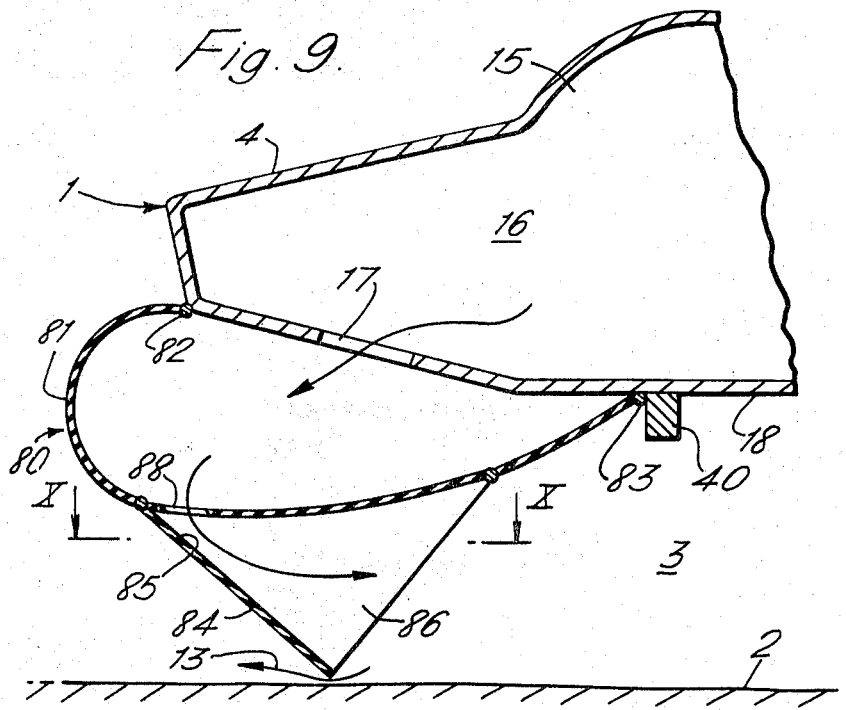

United States Patent

[11] 3,561,558

| [72] | Inventor | Robin Derrick Parkhouse<br>"Xixerella", La Massana,<br>Principat d'Andorra |
|---|---|---|
| [21] | Appl. No. | 752,514 |
| [22] | Filed | Aug. 14, 1968 |
| [45] | Patented | Feb. 9, 1971 |
| [73] | Assignee | Hovermarine Limited<br>Southampton, England<br>a British company |
| [32] | Priority | Aug. 14, 1967, Aug. 14, 1967, Aug. 25, 1967 |
| [33] | | Great Britain |
| [31] | | 37323/67, 37324/67 and 39337/67 |

[54] GROUND-EFFECT CRAFT
12 Claims, 10 Drawing Figs.

[52] U.S. Cl. .................................................. 180/120,
180/116, 180/123, 180/124, 180/127
[51] Int. Cl. ...................................................... B60v 1/14,
B60v 1/16, B60v 1/20
[50] Field of Search ............................................ 180/117,
120, 124, 128, 127, 123

[56] References Cited
UNITED STATES PATENTS

| 3,078,939 | 2/1963 | Bollum Sr. ...................... | 180/117 |
| 3,150,731 | 9/1964 | Franklin et al. ................ | 180/120 |
| 3,301,342 | 1/1967 | Jones et al. ..................... | 180/128 |
| 3,334,701 | 8/1967 | Chaplin .......................... | 180/127 |
| 3,379,271 | 4/1968 | Hopkins et al. ................. | 180/127X |
| 3,424,266 | 1/1969 | Cockerell ........................ | 180/124X |

FOREIGN PATENTS

| 246,358 | 9/1960 | Australia ........................ | 180/117 |

Primary Examiner—A. Harry Levy
Attorney—Cushman, Darby and Cushman

ABSTRACT: A ground-effect vehicle is provided with a flexible, cushion-containing skirt, a centrifugal fan for supply of cushion air, an airscrew for propelling the vehicle, rudders for steering the vehicle, "puff-ports" for supplying turning moments to the vehicle, the fan and airscrew being driven by separate engines.

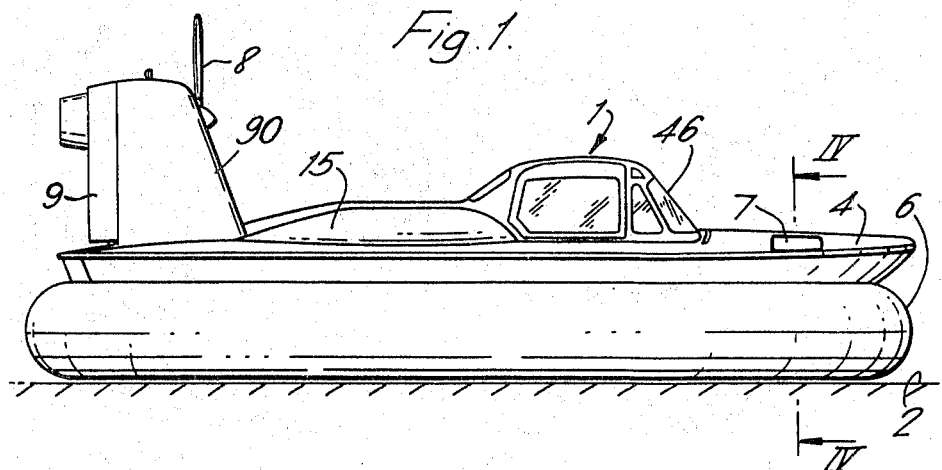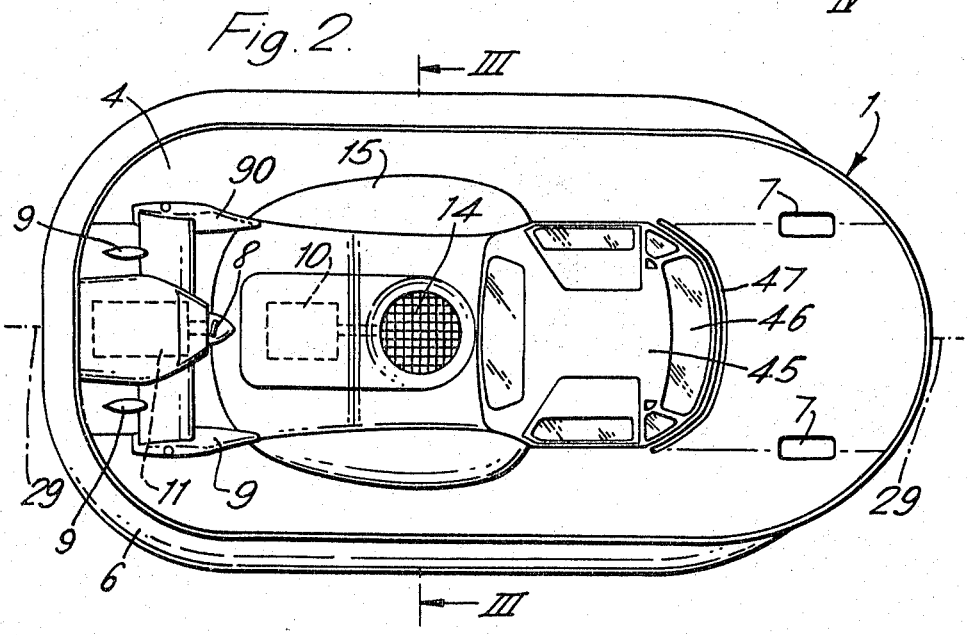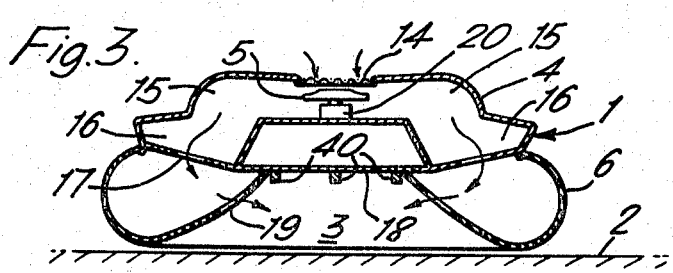

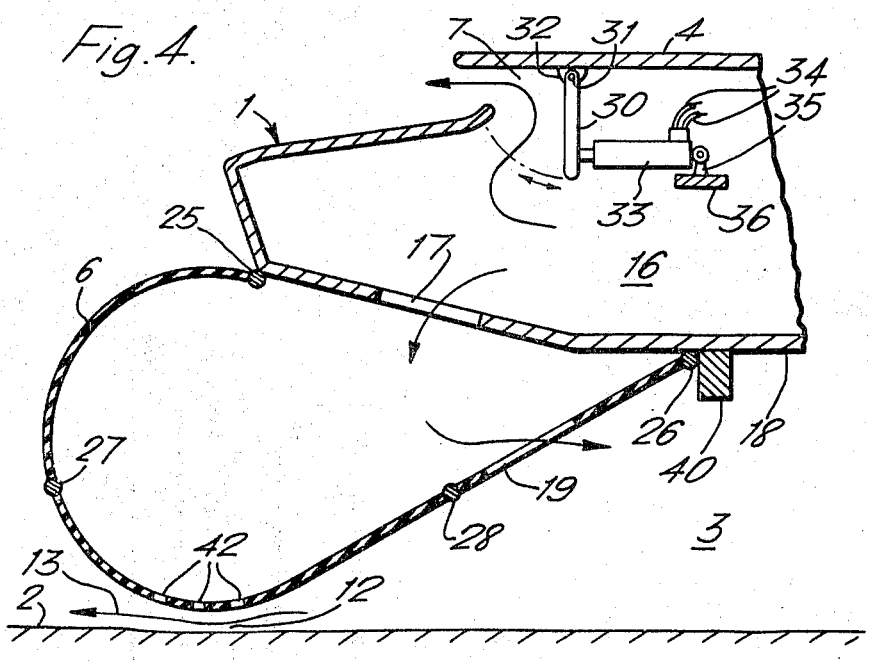
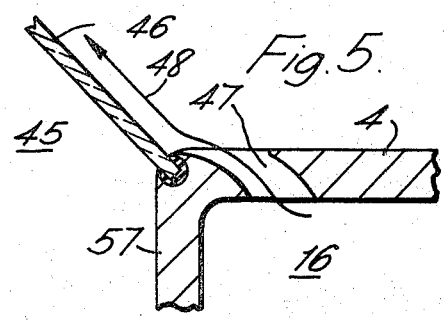
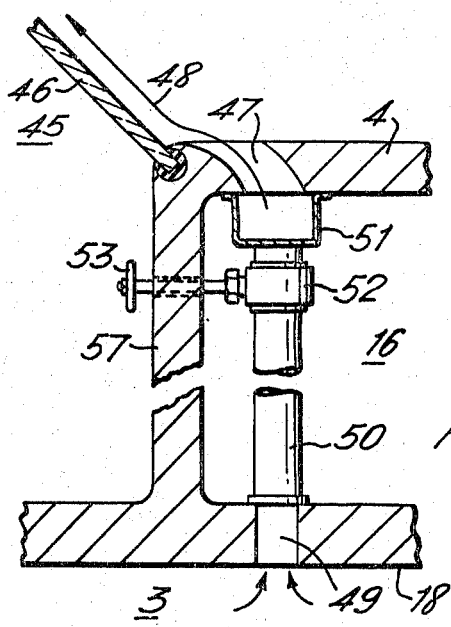

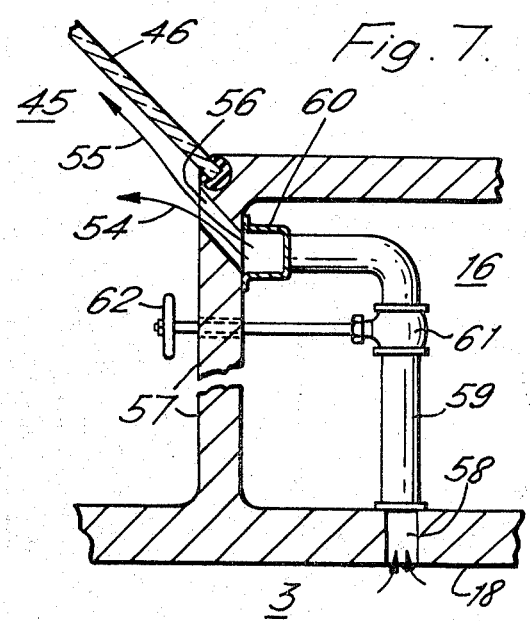
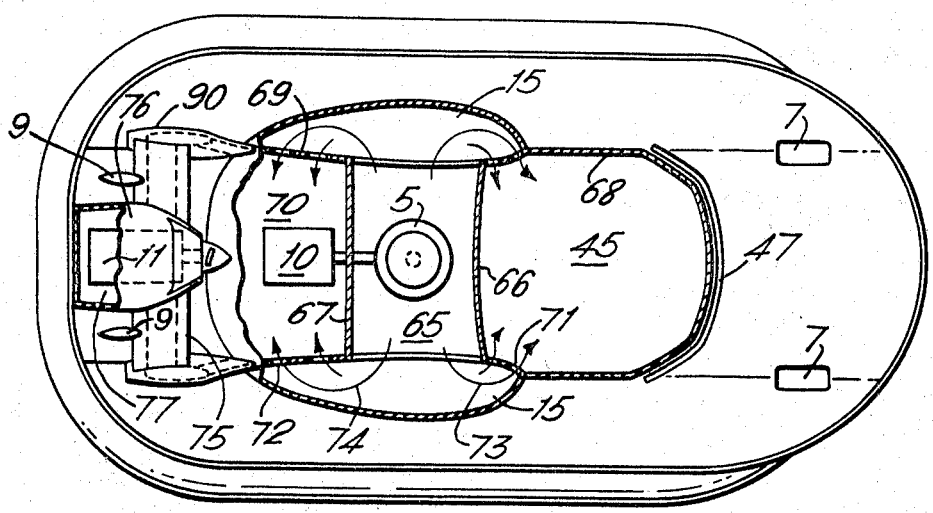

GROUND-EFFECT CRAFT

DESCRIPTION OF THE INVENTION

Air is taken from the cushion, or en route thereto, and is ducted over a windscreen so as to prevent buildup of spray. Air is also used to ventilate the cabin of the vehicle and is also supplied to the engine compartments associated with the fan and the airscrew.

This invention relates to ground-effect craft, by which is meant craft relying for their support upon a cushion of gas, usually air.

According to the present invention, a ground-effect craft comprises a body structure, means, including a fan, for forming a craft-supporting cushion of pressurized gas beneath the body structure, a flexible skirt attached to the body structure so as to depend therefrom, means for discharging fluid laterally from each side of the craft and at the front end thereof so as to apply turning moments to the craft, airscrew means for propelling the craft, aerodynamic control surface means for steering the craft, first engine means for driving the fan means and second engine means for driving the airscrew means.

Figure 10:
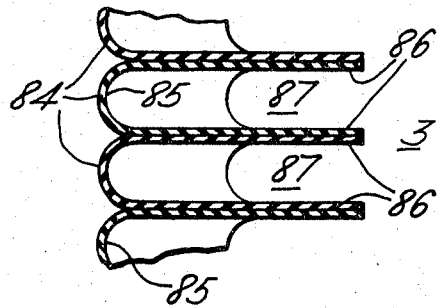

An embodiment of the invention will now be described by way of example with reference to the accompanying drawings, wherein:

FIG. 1 is a side view of an amphibious ground-effect craft;
FIG. 2 is a plan view of the craft;
FIG. 3 is a section, with some parts removed, taken on the line III–III of FIG. 2;
FIG. 4 is a part section, with some parts removed, and to an enlarged scale, taken on the line IV–IV of FIG. 1;
FIG. 5 is a fragmentary side view, in section and to an enlarged scale, of part of, the cabin area of the craft;
FIG. 6 is a view similar to that shown by FIG. 5 and illustrates a modification thereof;
FIG. 7 is another fragmentary side view, in section and to an enlarged scale, of part of the cabin area of the craft;
FIG. 8 is another plan view of the craft but with some of the upper part thereof removed;
FIG. 9 is a view similar to that shown by FIG. 4 and illustrates an alternative form of flexible skirt; and
FIG. 10 is a part section taken on the line X–X of FIG. 9.

With reference to FIGS. 1 to 4, an amphibious ground-effect craft 1 is supported above a ground surface 2 by a cushion 3 of pressurized air formed beneath the body structure 4 of the craft. The craft 1 comprises the body structure 4, means for forming the craft-supporting cushion 3 beneath the structure 4 and including centrifugal fan means 5 (FIG. 3), a cushion-containing flexible skirt 6 of annular inflatable form attached to and depending from the periphery of the body structure 4, means including a pair of outlet ports 7 for discharging air laterally from each side of the craft 1 and adjacent the front end thereof so as to apply turning moments to the craft, airscrew means 8 for propelling the craft, aerodynamic control surface means comprising rudders 9 for steering the craft, first engine means 10 (FIG. 2) for driving the fan means 5 and second engine means 11 for driving the airscrew means 8. As best shown in FIG. 2, the rudders 9 are disposed in a well-known manner in the slipstream of the airscrew means 8 where they are pivoted to steer the craft. The craft 1 is also provided with control fin structure 90.

In further detail, the craft 1 is of the so-called "plenum-chamber" type, air excess to cushion-forming requirements escaping to atmosphere by way of a small clearance 12 (FIG. 4) between the ground surface 2 and the bottom of the flexible skirt 6, as indicated by the arrow 13.

With particular reference to FIG. 3, the body structure is hollow and serves to conduct air discharged by the fan 5 to the hollow inflatable skirt 6. Air forming the cushion 3 is drawn in from the atmosphere by the fan 5, by way of an intake 14, and is discharged laterally into a pair of side ducts 15 and from thence to the interior of a plenum chamber 16 extending around the periphery of the craft body 4. From the chamber 16 the airflow to the flexible skirt 6 is by way of a series of ports 17 formed in the peripheral part of the undersurface 18 of the body 4 and from the interior of the skirt 6 there is a through-flow of air to the space occupied by the cushion 3, by way of outlet ports 19 formed in the inner surface of the skirt 6. The fan 5, which is mounted for rotation about a vertical axis, is driven by the engine 10 through a substantially right-angle drive, including a gearbox unit 20.

With reference to FIG. 4, the flexible skirt 6 is of envelope or bag forms and comprises sheets of rubberized fabric or nylon, opposite edges of which are demountably attached, at outer and inner points 25, 26, to the undersurface 18 of the vehicle body 4. If desired, for replacement of easily damaged bottom parts the skirt 6 may comprise upper and lower parts demountably attached to each other at outer and inner points 27, 28.

The air discharge ports 7 are formed at the front end of the craft body 4 and on each side of the fore and aft axis 29 (FIG. 2) of the craft. Being at the end of the craft, the ports provide for a substantial turning movement. Flow through the ports 7 is controlled by flap valves 30 pivotally mounted on pins 31 carried by brackets 32 attached to the shell of the body 4. The flap valves are moved into open (shown), closed and intermediate positions by hydraulic actuators 33, under the control, through flexible hydraulic signal lines 34, of the pilot of the craft. The actuators 33 are pivotally attached by brackets 35 to structures 36 within the plenum chamber 16 so that they can pivot as they are operated to close the valves 30.

In operation, one or the other of the valves 30 is operated to vent pressurized air from, or en route to, the flexible skirt 6 so as to apply, by reaction, turning moments to the craft 1. The craft 1 may thus be turned whilst "hovering" above a specified point on the land surface 2 and is not dependent on the propulsion means 8, 11.

Turning moments may also be applied by use of a port 7 when the craft 1 is moving over the surface 2 and independently of any turning moment which may be applied by the rudders 9.

In a (nonillustrated) modification, vent ports similar to the ports 7 may be disposed at each side of the craft 1 and at the rear end thereof. These further ports may be in addition to and in place of the existing ports 7.

Three laterally-spaced skegs 40 (see particularly FIG. 3) are attached to and extend lengthwise in substantially parallel array along the undersurface 18 of the craft body 1 to take the weight of the craft 1 when not supported by its cushion 3, as disclosed by copending U.K. application 16100/65 now British Pat. No. 1,158,641. When the craft 1 is "off-cushion" the skegs 40 also avoid damage to the fabric of the deflated skirt 6, which would occur by it being trapped between the craft body 4 and the ground 2.

As shown in FIG. 4, the convex bottom of the flexible skirt 6 is perforated by a series of small apertures (e.g. 1 inch diameter) drain holes 42 so that any water collecting in the skirt can drain away assisted by the pressure of the air inflating the skirt.

With reference now to FIGS. 2 and 5, the craft 1 includes a cabin 45 with a windscreen 46. Immediately in front of the windscreen 46 is a slot-shaped vent 47 which communicates with the plenum chamber 16. The vent 47 is shaped so as to direct fan-supplied air from the chamber 16 upwardly over the outer surface of the windscreen 46 and substantially parallel thereto as indicated by the arrow 47.

This arrangement is particularly effective when the craft 1 is operating over water as it maintains a continuously moving layer of relatively dry air over the windscreen 46 which carries away any water droplets before they are deposited thereon. Normally serious difficulty is experienced with ground-effect craft operating over water as vision is obstructed by spray generated by the escape of cushion air and depositing on the windscreen. Windscreen wipers are found to be of limited effectiveness to remove or prevent such deposits.

In the modification shown in FIG. 6, the windscreen-protecting flow of air 48 is taken not from the plenum chamber 16 but is taken instead from the space occupied by the craft-supporting cushion 3. In this modification the bottom surface 18 is perforated by a hold 49 and cushion air escaping through the hole is conducted to the vent 47 by way of a duct 50 and a manifold 51. Flow through the duct 50 is controlled by a valve 52, adjustable by means of a hand wheel 53, from inside the cabin 45.

Comparing the arrangements of FIGS. 5 and 6, in that of FIG. 5 the demisting airflow 48 comes from the plenum chamber 16, which is air en route to the skirt 6 and the cushion space, and is thus of higher pressure than the airflow 48 of FIG. 6 which comes from the cushion space. On the other hand, when the air is taken from the cushion space it is likely to be slightly drier than that in the plenum chamber 16.

In either or both of the arrangements of FIGS. 5 and 6, the vent 47 may be reorientated if required so as to vent the air with a forward instead of a rearward component of direction whereby it is blown on to the windscreen 46 by forward movement of the craft 1.

If desired, the arrangement of FIG. 5 may be provided with a manifold 51, control valve 52 and a shortened length of duct 50 having its lower end open to the plenum chamber 16 whereby air vented from the chamber 16 can be controlled.

With reference now to FIG. 7, air can be vented into the cabin 45 and also made to flow substantially parallel to the inner surface of the windscreen 46 as shown by the arrows 54, 55 respectively. This is done by providing a slotlike vent 56 in the cabin bulkhead 57 and connecting the vent to a hole 58 perforated in the bottom surface 18 of the craft body by means of a duct 59 and manifold 60. A valve 61 controls the flow of air from the cushion space to the cabin 45 and is adjustable by means of a hand wheel 62 from inside the cabin 45.

If air from the plenum chamber 16 is preferred instead, the arrangement of FIG. 7 can be modified in a manner similar to that described in the penultimate paragraph, i.e. in effect, by removing the portion of the duct 59 on the inlet side of the valve 61 and blanking off the hole 58.

The arrangement of FIG. 7 results in slight pressurization of the cabin 45 whereby moisture collecting therein tends to be driven out. Thus, auxiliary cabin pressurizing equipment is not required and, furthermore, no filters are required for cabin cooling and ventilation.

As shown in FIG. 8, air flowing from the fan 5 may also be used for cabin ventilation and cooling, and, furthermore, for the ventilation and cooling of the compartments housing the lift and propulsion engines 10, 11.

With reference to FIG. 8, the fan 5 which takes in atmospheric air from above discharges the air into a chamber 65, the fore-and-aft ends of which are defined by lateral walls or bulkheads 66, 67 disposed on each side of the vertical axis of the fan 5. The pressurized air is caused to flow laterally between the bulkheads 66, 67 and substantially normal thereto into the plenum chamber 16 by way of the two ducts 15 flanking the chamber 65. The ducts 15 extend beyond the bulkheads 66, 67 to overlap the sidewalls 68 of the cabin 45 and the sidewalls 69 of the compartment 70 housing the engine 10 driving the fan 5. Ports 71, 72 are formed in the overlapped portions of the sidewalls 68, 69 respectively. Airflow through the ports 71, 72, indicated by the arrows 73, 74 respectively, is controlled by shutters (not shown) adjustable from within the cabin 45.

The control fins 90 are of hollow construction and the winglike structure 75 extending laterally therebetween and on which the propulsion engine 11 is mounted is hollow also. The engine 11 is enclosed by a casing 76 and the space 77 between the casing 76 and the engine 11 is connected, by way of the hollow interiors of the structure 75 and fins 90, to the engine compartment 70. Thus, some of the air entering the compartment 70 is ducted to the compartment 77 of the propulsion engine 11 so as to cool and ventilate the latter.

If desired, transfer ducts may be provided between some of the ports 72 and the interiors of the fins 90 and between the remaining ports 72 and the cooling system (not shown) of the lift engine 10 so that precise proportions of air entering the ports 72 can be supplied to the engines 10 and 11.

Furthermore, transfer ducts may also be provided to duct air which has been used to cool and ventilate the engine 10 and/or the engine 11 and which has therefore been dried and warmed, to the cabin 45 for heating and/or windscreen demisting.

It will be noted that the ports 71, 72 accept air only indirectly with respect to the output direction of air from the fan 5. The output direction of air from the fan 5 is generally radial and positions of the ports 71, 72 are such that they do not present any inlets to any radius extending from the fan axis.

The arrangement takes advantage of the fact that the action of the fan 5 tends to dry the air. Any water droplets carried by air flowing to the fan 5 tend to be flung radially outwards by the centrifugal action of the fan and deposited on the walls of the fan chamber 65. Thus, any outlet from the fan chamber 65 which does not present an inlet to a radius from the fan axis receives dry air. This arrangement obviates the need for providing drying filter for engine/cabin cooling and ventilation.

In a (nonillustrated) modification, air is not ducted through the fins 90 and the horizontal structure 75 is replaced by a central, upstanding structure which supports the engine 11 and casing 76 above the vehicle body. The substitute structure is made hollow and is connected to the chamber 70 (or plenum 16) whereby air flows through the former to the compartment 77.

With reference now to FIGS. 9 and 10, the "single stage" flexible skirt 6 may be replaced by a "two-stage" flexible skirt 80 of the same or similar material. The upper stage of the skirt 80 comprises a flexible bag 81 formed by a sheet of flexible material, one edge of which is demountably attached to the body undersurface 18 at 82 and the opposite edge thereof at 83. The lower stage of the skirt 80 comprises a succession of independently deflectable skirt members 84 demountably attached to and depending from the bottom of the bag 81. Each skirt member 84 comprises a generally triangular sheet of flexible material folded over to give a skirt member a U-like lateral cross section with a middle or lateral portion 85 flanked by two side portions 86 so as to define a hollow 87 open to the cushion 3. The side portions 86 serve as ties in transferring inflation loads acting normal to the middle portions of the bag 81. The bag 81 is perforated by a series of outlet ports 88 through which air passes from the bag to the cushion space.

Further details of the craft 1 in its preferred form are as follows:

| | |
|---|---|
| Length overall: | 27 feet 11 inches |
| Body length: | 27 feet 11 inches |
| Beam overall: | 12 feet 10 inches |
| Height overall: | 7 feet 7 inches (off-cushion) |
| Cushion pressure: | 15.5 lb./sq. ft. (approximate) |
| Cushion depth: | 2 feet |
| Cushion area: | 277 square feet |
| Dry weight: | 3,240 lbs. |
| All-up weight: | 4,200 lbs. |
| Normal capacity: | 4 persons or driver plus 500 lbs. |
| Lift engine: | Volkswagen 1584 c.c. |
| Lift fan: | 43 inch diameter "Rotafoil" |
| Propulsion engine: | Volkswagen 1584 c.c. or Porsche 1582 c.c. |
| Propulsion airscrew: | 6 feet 6 inches diameter. |

I claim:

1. A ground-effect craft comprising a body structure, means, including a fan, for forming a craft-supporting cushion of pressurized gas beneath said body structure, a flexible skirt attached to said body structure so as to depend therefrom, means for discharging fluid laterally from each side of said craft and at the front end thereof so as to apply turning moments to the craft, airscrew means for propelling said craft, aerodynamic control means for steering said craft, first engine means for driving said fan means, second engine means for driving an airscrew means, said body structure including a cabin with a windscreen, and means for directing gas discharged by said fan upwardly over said windscreen.

2. A craft as claimed in claim 1 wherein said body structure is hollow so as to conduct gas discharged by said fan to the space occupied by the craft-supporting cushion, said means for directing gas over said windscreen comprising means for venting gas from the interior of the body structure.

3. A craft as claimed in claim 1 wherein said means for directing gas over said windscreen comprise means for venting gas from the space occupied by the craft-supporting cushion.

4. A ground-effect craft comprising a body structure, means, including a fan, for forming a craft-supporting cushion of pressurized gas beneath said body structure, a flexible skirt attached to said body structure so as to depend therefrom, means for discharging fluid laterally from each side of said craft and at the front end thereof so as to apply turning moments to the craft, airscrew means for propelling said craft, aerodynamic control means for steering said craft, first engine means for driving said fan means, second engine means for driving said airscrew means, said body structure having at least one compartment, and conduit means for taking air indirectly with respect to the output direction of air from said fan and for supplying the air so taken to said compartment.

5. A craft as claimed in claim 4 wherein said body structure is hollow, said flexible skirt comprises an inflatable envelope, and said body structure serves to conduct gas discharged by said fan to the interior of said envelope so as to inflate said envelope.

6. A craft as claimed in claim 4 wherein said body said body structure is hollow and said means for discharging fluid laterally from each side of the craft comprise valve means for venting gas from the hollow interior of the body structure.

7. A craft as claimed in claim 4 wherein said flexible skirt comprises an inflatable envelope and the inner surface of said inflatable envelope is provided with outlet means whereby a flow of gas takes place from the interior of said envelope to the space occupied by the craft-supporting cushion.

8. A craft as claimed in claim 4 wherein the compartment comprises a cabin.

9. A craft as claimed in claim 6 wherein the compartment houses one of said engines.

10. A craft as claimed in claim 4 provided with fin control means of hollow form which comprises part of said conduit means.

11. A craft as claimed in claim 4 wherein said fan is a centrifugal fan mounted for rotation about a vertical axis and wherein the conduit means comprise a wall disposed on each side of the fan and extending laterally of the craft and means for causing air flowing laterally from between the walls to flow substantially normal thereto.

12. A ground-effect craft as claimed in claim 4 wherein said flexible skirt is of two-stage form and wherein the upper stage comprises an inflatable bag and the lower stage a succession of independently deflectable skirt members attached to and depending from the bottom of the bag.